(12) United States Patent
Deghel et al.

(10) Patent No.: US 12,323,216 B2
(45) Date of Patent: Jun. 3, 2025

(54) SPATIAL CONFIGURATION ADAPTATION

(71) Applicant: NOKIA TECHNOLOGIES OY, Espoo (FI)

(72) Inventors: Matha Deghel, Paris (FR); Filippo Tosato, Bures sur Yvette (FR); Mihai Enescu, Espoo (FI); Keeth Saliya Jayasinghe Laddu, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/928,729

(22) Filed: Oct. 28, 2024

(65) Prior Publication Data

US 2025/0055550 A1  Feb. 13, 2025

Related U.S. Application Data

(63) Continuation of application No. PCT/EP2022/072680, filed on Aug. 12, 2022.

(51) Int. Cl.
*H04B 7/06* (2006.01)
*H04B 7/08* (2006.01)

(52) U.S. Cl.
CPC ....... *H04B 7/06956* (2023.05); *H04B 7/0802* (2013.01)

(58) Field of Classification Search
CPC .......... H04B 7/06956; H04B 7/0802
See application file for complete search history.

(56) References Cited

U.S. PATENT DOCUMENTS

2024/0049015 A1\* 2/2024 Li .............. H04B 7/0639

OTHER PUBLICATIONS

International Search Report and Written Opinion dated May 4, 2023 corresponding to International Patent Application No. PCT/EP2022/072680.
Huawei et al., "Discussion on CSI Framework Design," R1-1706926, 3GPP TSG RAN WG1 Meeting #89, Hangzhou, China, May 15-19, 2017, May 14, 2017, XP051272156.

\* cited by examiner

*Primary Examiner* — Nader Bolourchi
(74) *Attorney, Agent, or Firm* — SQUIRE PATTON BOGGS (US) LLP

(57) ABSTRACT

Example embodiments of the present disclosure relate to devices, methods, apparatuses and computer readable storage media for dynamic antenna port related configuration. The method comprises: receiving, at a terminal device and from a network device, a first indication of a plurality of subsets of antenna ports; and receiving, at the terminal device and from the network device, a second indication of disabling at least one of the plurality of subsets of antenna ports.

20 Claims, 6 Drawing Sheets

SPATIAL CONFIGURATION ADAPTATION

CROSS-REFERENCE TO RELATED APPLICATION

This application is a Continuation of International Patent Application No. PCT/EP2022/072680 filed on Aug. 12, 2022, which is incorporated herein by reference in its entirety.

FIELD

Embodiments of the present disclosure generally relate to the field of telecommunication and in particular, to devices, methods, apparatus and computer readable storage media for spatial configuration adaptation.

BACKGROUND

The radio access network (RAN) suffers from a large power consumption. Hence, network energy saving techniques of transmissions and/or receptions are needed in time, frequency, spatial, and power domains. For example, spatial elements of the gNB, such as antennal elements, logical antenna ports, etc., are expected to be adapted to the network condition, system capacity, traffic demand, and so on. This may be implemented via a dynamic spatial-domain configuration adaptation.

SUMMARY

In general, example embodiments of the present disclosure provide a solution of dynamic spatial configuration adaptation.

In a first aspect, there is provided a first device. The first device comprises at least one processor; and at least one memory storing instructions that, when executed by the at least one processor, cause the first device at least to: receive, from a second device, a first indication of a plurality of subsets of antenna ports; and receive, from the second device, a second indication of disabling at least one of the plurality of subsets of antenna ports.

In a second aspect, there is provided a second device. The second device comprises at least one processor; and at least one memory storing instructions that, when executed by the at least one processor, cause the second device at least to: transmit, to a first device, a first indication of a plurality of subsets of antenna ports; and transmit, to the first device, a second indication of disabling at least one of the plurality of subsets of the antenna ports.

In a third aspect, there is provided a method. The method comprises: receiving, at a terminal device and from a network device, a first indication of a plurality of subsets of antenna ports; and receiving, at the terminal device and from the network device, a second indication of disabling at least one of the plurality of subsets of antenna ports.

In a fourth aspect, there is provided a method. The method comprises: transmitting, at a network device and to a terminal device, a first indication of a plurality of subsets of antenna ports; and transmitting, at the network device and to the terminal device, a second indication of disabling at least one of the plurality of subsets of the antenna ports.

In a fifth aspect, there is provided an apparatus. The apparatus comprises: means for receiving, from a network device, a first indication of a plurality of subsets of antenna ports; and means for receiving, from the network device, a second indication of disabling at least one of the plurality of subsets of antenna ports.

In a sixth aspect, there is provided an apparatus. The apparatus comprises: means for transmitting, to a terminal device, a first indication of a plurality of subsets of antenna ports; and means for transmitting, to the terminal device, a second indication of disabling at least one of the plurality of subsets of the antenna ports.

In a seventh aspect, there is provided a computer readable medium comprising instructions which, when executed by an apparatus, cause the apparatus to perform at least the following: receiving, from a network device, a first indication of a plurality of subsets of antenna ports; and receiving, from the network device, a second indication of disabling at least one of the plurality of subsets of antenna ports.

In an eighth aspect, there is provided computer readable medium comprising instructions which, when executed by an apparatus, cause the apparatus to perform at least the following: transmitting, to a terminal device, a first indication of a plurality of subsets of antenna ports; and transmitting, to the terminal device, a second indication of disabling at least one of the plurality of subsets of the antenna ports.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
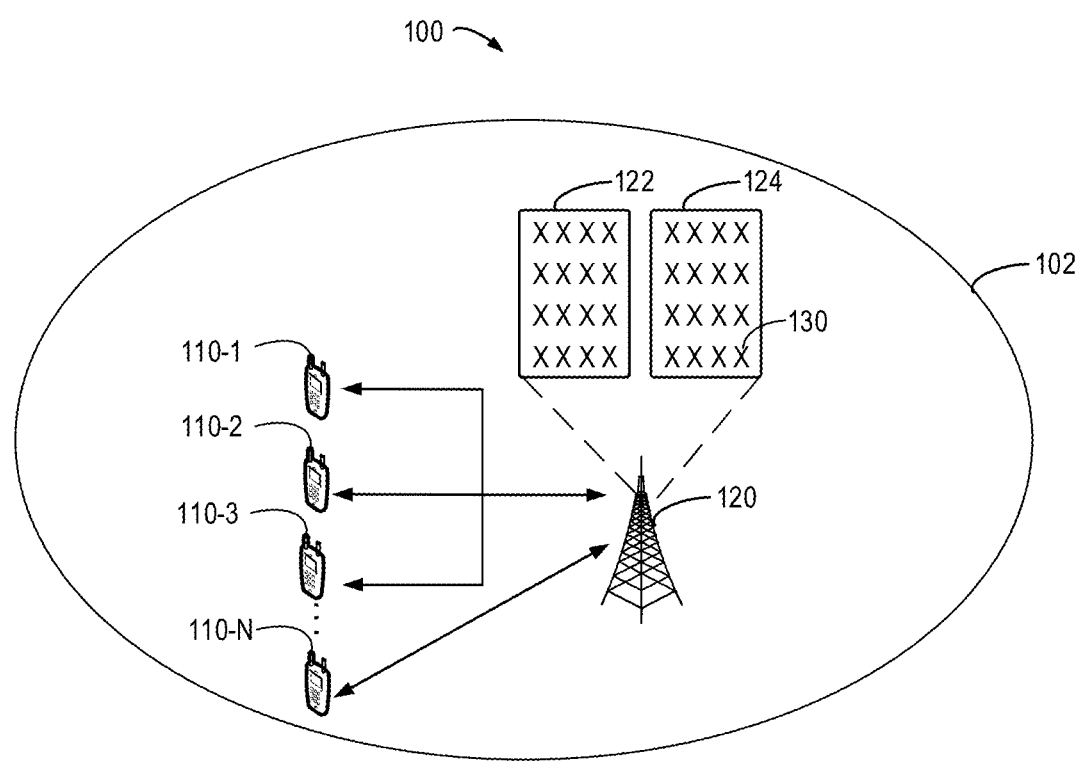
FIG. 1 illustrates an example network system in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, "at least one of the following: <a list of two or more elements> and "at least one of <a list of two or more elements> and similar wording, where the list of two or more elements are joined by "and" or "or", means at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a Next Generation NodeB (NR NB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Example Environment

FIG. 1 illustrates an example communication environment 100 in which example embodiments of the present disclosure can be implemented. As shown in FIG. 1, the communication environment 100 may include a plurality of first devices 110-1 to 110-N and a second device 120. The plurality of first devices 110-1 to 110-N may be terminal devices (e.g., UEs), hereinafter which may be collectively referred to as first device 110. The second device 120 may be a network device (e.g., gNB) serving terminal devices located in a cell 102.

The first device 110 and the second device 120 can communicate with each other. For example, the second device 120 may configure channel state information reference signal (CSI-RS) resources for the first devices 110-1 to 110-N. Accordingly, the first devices 110-1 to 110-N may receive and measure respective CSI-RSs on those configured resources.

The CSI-RSs may be UE-specifically configured via radio resource control (RRC) message. Additionally, or alternatively, CSI-RSs may also be shared among multiple UEs, i.e., more than one UE is configured to receive the same resource elements (RE). In the example of FIG. 1, if all the first devices 110-1 to 110-N within the cell 102 share the same CSI-RS resources, the arrangement may be referred to as a cell specific CSI-RS. If only a part of first devices 110-1 to 110-N within the cell 102 shares the same CSI-RS resources, for example, a group of first devices 110-1 to 110-3, the arrangement may be referred to as a group-specific CSI-RS. If each of the first devices 110-1 to 110-N has its own CSI-RS resource, the arrangement may be referred to as a UE-specific CSI-RS. However, the arrangement of the CSI-RS resources is only known to the second device 120, the first device 110 is unaware of if the CSI-RS resource is shared with another device or not.

In some cases, the first device 110 may be configured with up to 48 report configurations per component carrier (CC) or 4 per bandwidth part (BWP). One CSI resource configuration within 1 report configuration may be configured with up to 16 resource sets (e.g., aperiodic CSI), or otherwise 1 resource set. In each CSI resource set, there are up to 64 NZP CSI-RS resources and 1 NZP-CSI-RS resource is with up to 32 antenna ports.

For CSI acquisition, the first device 110 may be also configured with a codebook type. Given the measured channel across a CSI-RS resource, the first device 110 chooses a codeword from the specified codebook, i.e., precoding matrix indicator (PMI), along with channel quality indicator (CQI), rank indicator (RI). The first device may also be configured to measure several CSI-RS resources (e.g., up to 8) within a resource set and report the favorite resource, CSI-RS resource indicator (CRI), along with PMI, CQI and RI which corresponds to that selected resource.

As shown in FIG. 1, the second device 120 may be equipped with an antenna array consisting of one or multiple panels 122 and 124, each includes a plurality of antenna elements 130. These antenna elements 130 may be further arranged to be antenna ports (not shown) for at least one CSI-RS resource or CSI-RS resource set.

It should be understood that multi-panel gNB or multi-panel network device is only one of the implementations of the second device 120. Additionally, or alternatively, in some example embodiments, the second device 120 may be implemented by using multi-Transmission and Reception (multi-TRP) techniques.

The antenna ports of the second device 120 may be split to be a plurality of subsets of antenna ports, and each of the plurality of subsets of antenna ports may include at least one antenna port. The plurality of antenna port subsets may include a primary subset of antennal ports that corresponds to a first set of CSI-RS resources and at least one secondary subset of antennal port that corresponds to at least one second set of CSI-RS resources. For each of the first devices 110-1 to 110-N, at least one subset of antenna ports may be configured.

In some example embodiments, the second device 120 may disable or enable at least one of the antenna port subsets, e.g., for power saving purpose. A disabling or enabling indication may be transmitted to the first device 110 via downlink control information (DCI), a medium access control (MAC) control element (CE), a system broadcast message, and so on. Such an indication may be transmitted separately for different devices 110-1 to 110-N, or in a group common signaling, which will be described in detail below. It should be understood that, in some of the example embodiments, the terms "enable" and "re-enable" may have similar meanings, and thus may be used interchangeably. For example, for an antenna port subset that was disabled previously from an activated state, the second device 120 then enables the antenna port, in this case, the term "enable" means that such an antenna port is enabled again, i.e., re-enabled.

In addition to the above antenna port configuration and indications, in some other embodiments, additional information or parameters, such as, codebook configurations, codebook subset restriction (CBSR), rank restriction, multi-panel restriction (e.g., ng-N1-N2 parameter), CSI-RS resource mapping, CSI resource periodicity and offset, etc., may also be dynamically adapted and configured by the second device 120 via either separate signaling for different devices or a group common signaling.

It should be also understood that the number of the network device and the terminal devices, and the arrangement of antenna panel and antenna elements shown in FIG. 1 is given for the purpose of illustration without suggesting any limitations. The communication network 100 may include any suitable number of network devices and terminal devices, and use a different arrangement of antenna panel and antenna elements.

It is to be understood that the number of devices and their connections as well as the arrangement of antenna array shown in FIG. 1 are only for the purpose of illustration without suggesting any limitation. The communication environment 100 may include any suitable number of devices or a different arrangement of antenna array configured to implementing example embodiments of the present disclosure. Although not shown, it would be appreciated that one or more additional devices may be located in the cell 102, and one or more additional cells may be deployed in the communication environment 100.

It is also noted that although illustrated as a network device, the second device 120 may be other device than a network device. Although illustrated as a terminal device, the first device 110 may be other device than a terminal device. In the following, for the purpose of illustration, some example embodiments are described with the first device 110 operating as a terminal device and the second device 120 operating as a network device. However, in some example embodiments, operations described in connection with a terminal device may be implemented at a network device or other device, and operations described in connection with a network device may be implemented at a terminal device or other device.

In some example embodiments, if the first device 110 is a terminal device and the second device 120 is a network device, a link from the second device 120 to the first device 110 is referred to as a downlink (DL), while a link from the first device 110 to the second device 120 is referred to as an uplink (UL). In DL, the second device 120 is a transmitting (TX) device (or a transmitter) and the first device 110 is a receiving (RX) device (or a receiver). In UL, the first device 110 is a TX device (or a transmitter) and the second device 120 is a RX device (or a receiver).

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

The spatial domain adaptation may in turn impact the UE's operation, including but not limited to, reference signal (RS) measurements, channel state information (CSI) feedback, uplink transmission (e.g., PUSCH, PDSCH, etc.) repetition, Sounding Reference Signal (SRS) transmission, TCI (Transmission Configuration Indicator) configuration, beam management, beam failure recovery, radio link monitoring, cell selection, cell re-selection handover, initial access, and so on. Thus, there is a need to improve spatial domain adaptation and configuration.

Work Principle and Example Signaling for Communication

According to some example embodiments of the present disclosure, there is provided a solution for dynamic antenna port related configuration. In this solution, the UE receives a first indication of a plurality of subsets of antenna ports from the gNB. The UE further receives a second indication of disabling at least one of the plurality of subsets of antenna ports. Such indications may be transmitted to different UEs in separate messages, or in a group common message. The antenna ports can be dynamically enabled or disabled depending on the network condition, traffic demand, and so on. In this way, the network energy saving can be achieved. Furthermore, both the group common configuration and UE specific configuration are supported, thus DL signaling overhead can be reduced.

Example embodiments of the present disclosure will be described in detail below with reference to the accompanying drawings.

Figure 2:
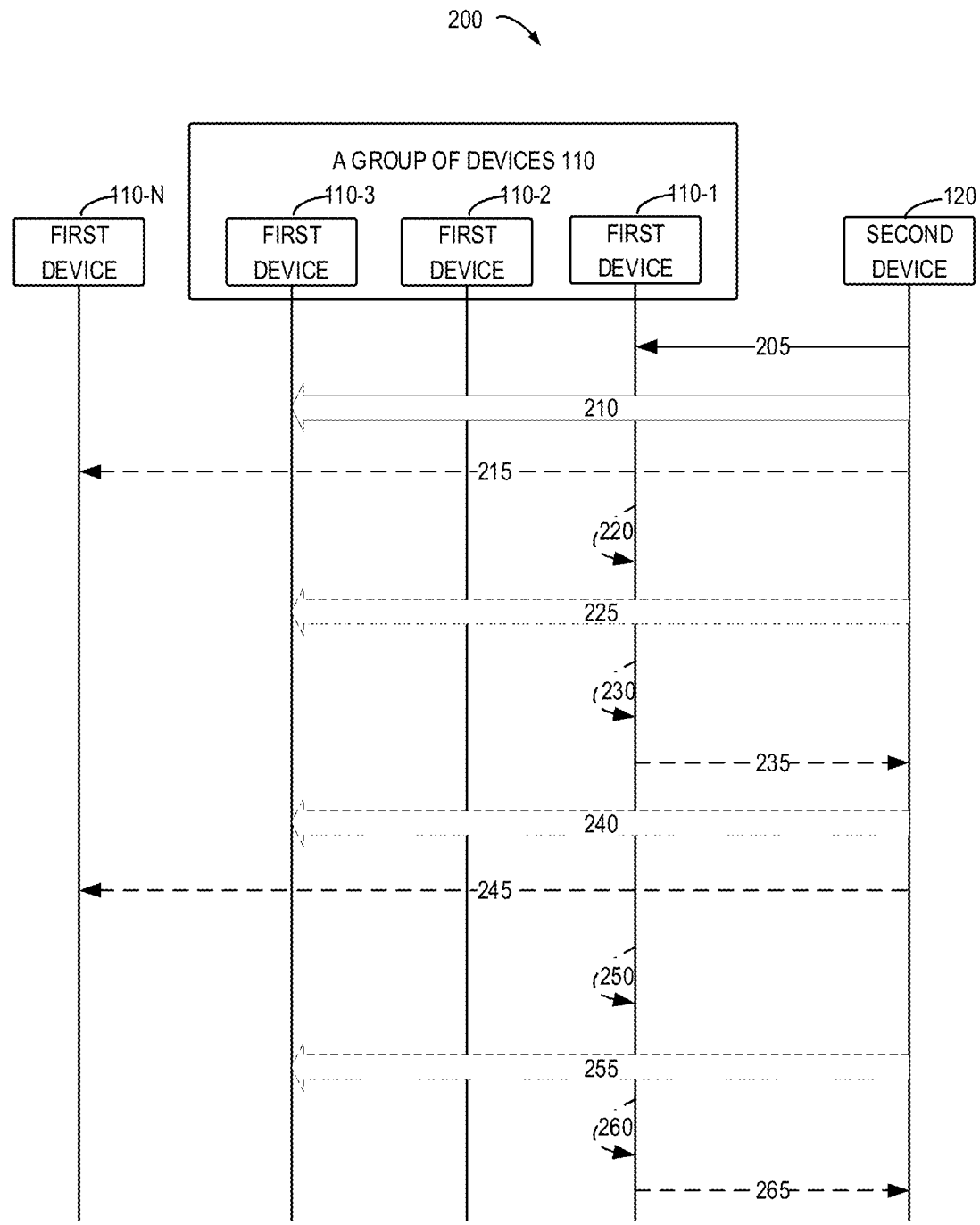
FIG. 2 illustrates a signaling chart for communication according to some example embodiments of the present disclosure.

Reference is now made to FIG. 2, which shows a signaling chart 200 for communication according to some example embodiments of the present disclosure. As shown in FIG. 2, the signaling chart 200 involves first devices 110-1 to 110-N and the second device 120, where the first devices 110-1 to 110-3 consist of a group of devices 110. For the purpose of discussion, reference is made to FIG. 1 to describe the signaling chart 200. Although first devices 110-1 to 110-3 and 110-N and one second device 120 are illustrated in FIG. 2, it would be appreciated that there may be a plurality of first devices and a larger or smaller group of devices performing similar operations as described with respect to the shown first devices 110 below and a plurality of second devices performing similar operations as described with respect to the second device 120 below.

As previously mentioned, the second device 120 may split the antenna ports into a plurality of antenna port subsets including a primary subset and at least one secondary subset. In the process 200, the second device 120 transmits 205 a first indication of the plurality of subsets of antenna ports to the first device 110-1. Likewise, the second device 120 also transmits the first indication to other devices including the first devices 110-2 to 110-N. In some example embodiments, an antenna port subset may be a code division multiplexing (CDM) port group or may include antenna ports from the same CDM port group. In some other embodiments, an antenna port subset may include antenna ports across different code CDM port groups.

The second device 120 is able to dynamically adapt the spatial elements, which may depend on the network energy consumption, the traffic demand, the network condition and so on. In some cases, the second device 120 may determine to disable some of the plurality of antenna port subsets. In this case, the second device 120 transmits 210 a second indication of disabling at least one of the plurality of subsets of antenna ports to the first device 110-1. In the example of FIG. 1, the first devices 110-1 to 110-3 are in a same group, thus the second indication may be transmitted in a group common message, for example, DCI, a MAC CE, etc., that is specific to the group of devices 110-1 to 110-3.

In some example embodiments, each of the group of devices 110-1 to 110-3 may receive the second indication in a group common message based on a radio network temporary identity (RNTI), a search space set (SSS), a control resource set (CORESET) and so on.

In some example embodiments, the second indication in the group common message may include at least one of the following:

first information related to whether or not at least one secondary subset of antenna ports for a corresponding first device 110 is enabled or disabled, second information related to which of the at least one secondary subset for the corresponding first device 110 is enabled or disabled, in a case that the first device 110 is configured with multiple secondary subsets, third information related to whether or not at least one of the first information or the second information is destined to the first device 110.

Alternatively, in some other embodiments, the same second indication of disabling or enabling the antenna port subsets may be transmitted to all the first devices 110-1 to 110-3. This may be suitable in case of cell or UE-group specific CSI-RS resources.

In some other embodiments, the second indication may be separately transmitted to different UEs. As shown in FIG. 2, the second device 120 may transmit 215 the second indication in a message that is specific to the first device 110-N. The message may be for example, DCI, a MAC CE, or etc. It should be understood that, in some other embodiments, the second device 120 may also transmit the second indication in separate messages (e.g., DCI, a MAC CE, etc.) for the devices in the same group.

In some example embodiments, information related to which one or more CSI-RS resource or CSI-RS resource set the at least one antenna subset port (i.e., as indicated to be disabled or enabled) corresponds to may also be transmitted in the second indication or transmitted together with the second indication. Additionally, or alternatively, in some other embodiments, such information may be transmitted via a separate message (e.g., DCI, a MAC CE, RRC, etc.) from the message used for carrying the second indication.

In some example embodiments, the second device 120 is one of the multiple TRPs serving the first device 110, each TRP may have at least one antenna port subset that could be dynamically disabled, enabled or re-enabled. In this case, the second indication, or a separate indication (via DCI, MAC CE or RRC), may also carry information on which one or more TRP e.g., the at least one indicated disabled antenna port subset corresponds to, where a TRP may be identified, for example, by a TRP ID, CORESETPoolIndex, or physical cell ID, etc.

In the multi-TPR case, the second device 120 may transmit the second indication for disabling antenna port subset for each of the TRPs by using the same message. Additionally, or alternatively, in some example embodiments, an association between an identifier of the TRP (e.g., the TRP ID, CORESETPoolIndex, or PCI) and at least one secondary port subset may be configured. For example, in a case where CORESETPoolIndex is used for identifying TRPs, along with the association of at least one secondary port subset to a respective CORESETPoolIndex, the first device 110 may know which antenna port subset to concern based on the CORESET on which the PDCCH carrying the DCI, or scheduling PDSCH carrying the MAC CE, that contains the second indication. The antenna port subset is the one associated with the CORESETPoolIndex to which the CORESET belongs.

The UE has no need to carry measurements or reporting CSI for any antenna port subset that is disabled. Accordingly, the first device 110 may determine the activated subset of antenna ports based on the first indication and the second indication. For example, the first device 110-1 may determine 220 at least one first subset of antenna ports from the plurality of subsets of antenna ports based on the first and second indications. In the context of the example embodiments, the at least one first subset of antenna ports refers to at least one activated subset of antenna ports to be used for communication between the first device 110 and the second device 120. Likewise, the first devices 110-2 to 110-N may also determine corresponding first subset of antenna ports based on the first and second indications.

In some example embodiments, the second device 120 may then transmit 225, to the first device 110, at least one CSI-RS via the at least one first subset of antenna ports. Taking the first device 110-1 as a representative of the first devices 110-1 to 110-N, the first device 110-1 may measure 230 the at least one CSI-RS corresponding to the at least one first subset of antenna ports. In this case, the first device 110 may then transmit 235, to the second device 120, a first CSI report related to a measurement result of the at least one CSI-RS.

In some example embodiments, the second device 120 may determine to re-enable some of the antenna port subsets that was previously disabled. In this case, the second device 120 may transmit 240 a third indication of enabling at least one subset that was disabled via the second indication. Likewise, the third indication may be transmitted via a group common message specific to the group of devices 110-1 to 110-3. Additionally, or alternatively, the second device 120 may transmit 245 the third indication in a separate message specific to an individual device, e.g., the first device 110-N.

Still taking first device 110-1 as a representative, in this case, the first device 110-1 may determine 250 a plurality of second subsets of antenna ports from the plurality of subsets of antenna ports based on the third indication. The second device 120 may transmit 255 a plurality of CSI-RSs corresponding to the plurality of second subsets of antenna ports. Accordingly, the first device 110 may measure 260 the plurality of CSI-RSs. The first device 110 may then transmit 265, to the second device 120, a second CSI report related to the plurality of CSI-RSs.

In some example embodiments, the primary subset of antenna ports may not be dynamically disabled. Alternatively, in some other embodiments, the primary subset of antenna ports may be dynamically disabled or enabled in an analogous manner as described with respect to the secondary subset of antenna ports.

In some example embodiments, the first device 110 determines at least one secondary subset of antenna ports is to be disabled based on the second indication. Based on this determination, the first device 110 may apply a CBSR or a related parameter (e.g., ng-N1-N2 parameter) associated with the at least one secondary subset of antenna ports for the first device 110. In this case, the association of the antenna port subsets and the CBSR implicitly indicates whether the N1-N2 parameter is applicable. This allows a reduced signaling overhead and power consumption, since the dynamic configuration or indication of CBSR can be omitted.

In addition to the second indication of disabling or enabling antenna port subset, other configuration or parameters may also be indicated to the first device 110 in a message either specific to an individual device or specific to a group of devices. In some example embodiments, the second device 120 may transmit a fourth indication of a CBSR, for example, ng-N1-N2 parameter or N1-N2 parameter. Additionally, or alternatively, the second device 120 may transmit a fifth indication of a rank restriction to the first device 110.

Either or both of the fourth indication and the fifth indication may be transmitted in an analogous manner as described with respect to the second indication, i.e., in separate DCIs or MAC CEs to different UEs, or alternatively, in a same DCI or MAC CE to multiple UEs e.g. through the group common signaling as described above.

Figure 3:
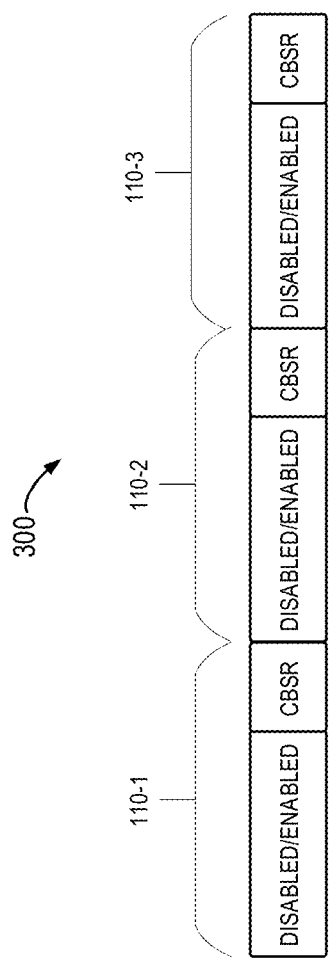
FIG. 3 illustrates a schematic diagram of an example group common configuration according to some example embodiments of the present disclosure.

In some example embodiments, the fourth indication of CBSR may be transmitted together with the second indication of disabling or enabling antenna port subset. FIG. 3 illustrates a schematic diagram of an example group common configuration 300 according to some example embodiments of the present disclosure. The group common configuration 300 may be used for carrying the second indication in a group common message, e.g., DCI, a MAC CE specific to the group of devices 110-1 to 110-3. It should be understood that the length of the group common configuration 300 may be extensible, which depends on the number of devices in the group.

As shown in FIG. 3, the group common configuration 300 includes at least a first field of port subset disabling or enabling, and a second field of CBSR. The size of the first filed may depend on the number of secondary antenna port subsets. In a case where a single secondary subset of antenna ports is configured, only one bit is in the first field. The first field includes at least one bit for indicating whether the at least one of the plurality of subsets of antenna ports is disabled or enabled. The size of the second filed may depend on the number of CBSR or N1-N2 parameter in general or dedicated for dynamic change. The second field includes at least one bit for indicating the CBSR for the group of devices 110-1 to 110-3. In some example embodiments, in addition to the port subset disabling or enabling, restriction on rank may also be indicated for each of the first devices 110-1 to 110-N.

In some example embodiments where the second device 120 is a multi-panel gNB, such as, of type I multi-panel, multi-panel restriction (e.g., ng-N1-N2 parameter) and/or the number of panels may be indicated to multiple UEs via a group common DCI or MAC CE. Alternatively, any or both information may be indicated via separate DCI or MAC CE to different UEs. In this case, the second device 120 may transmit a sixth indication of at least one of the following: a multi-panel restriction for the second device 120 or a number of antenna panels, or which panels are muted or active, for the second device 120.

In some example embodiments, at least one of the following parameters or configurations may also be indicated via separate DCI or MAC CE to different UEs or a group common DCI or MAC CE:

CSI-RS-ResourceMapping or any parameter within this information element (IE), such as, nrofPorts, frequencyDomainAllocation, etc., Any parameter within NZP-CSI-RS-Resource IE, such as CSI-ResourcePeriodicity AndOffset, resource mapping, etc., Any parameter in CodebookConfig.

It should be understood that some of the steps in process 200 is optional or can be omitted, and the order of the steps is given for an illustrative purpose. Additionally, some of the steps may be performed in parallel with other steps. Thus, the embodiments of the present disclosure are not limited in this regard.

Figure 4:
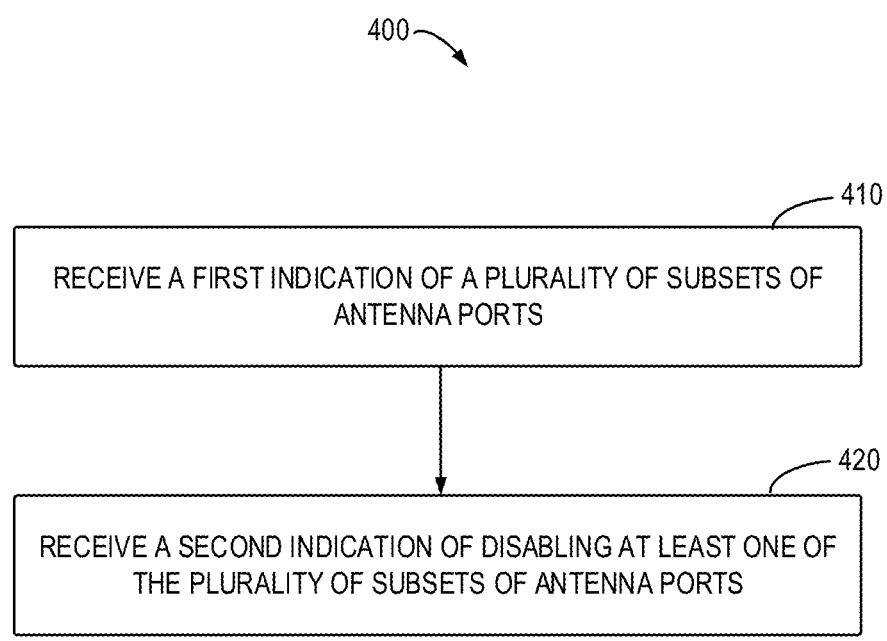
FIG. 4 illustrates a flowchart of an example method according to some example embodiments of the present disclosure.

FIG. 4 illustrates a flowchart of an example method 400 according to some example embodiments of the present disclosure. The method 400 can be implemented at a terminal device, for example, the first device 110 (i.e., any one or more of first devices 110-1 to 110-N) described with reference to FIG. 1. For the purpose of discussion, the method 400 will be described with reference to FIG. 1. However, in some other embodiments, the method 400 can also be implemented at any other device, for example, a gNB, such as, a CU, DU, or so on. Therefore, the scope of the present disclosure is not limited in this regard.

At 410, the first device 110 receives, from a second device 120, a first indication of a plurality of subsets of antenna ports. The first indication may be via, for example, DCI, a MAC CE, a RRC message, a system broadcast message, etc.

In some example embodiments, the plurality of subsets of antenna ports may comprise a primary subset of antenna ports corresponding to a first set of CSI-RS resources and at least one secondary subset of antenna ports corresponding to at least one second set of CSI-RS resources.

At 420, the first device 110 receives, from the second device, a second indication of disabling at least one of the plurality of subsets of antenna ports.

In some example embodiments, the second indication may be via DCI, a MAC CE, etc., that is specific to the first device 110, or a system broadcast message. In other words, for each of the first devices 110-1 to 110-N, a different and separate second indication may be transmitted by the second device 120.

In some example embodiments, the second indication may be via DCI, a MAC CE, etc., that is specific to a group of devices comprising the first device 110. In this case, the second indication may be received based on at least one of the following: a RNTI for the group of devices, or a SSS associated with the group of devices, or a control resource associated with the group of devices (e.g., CORESET). In this case, the second indication is provided as a group common indication, and the group of devices 110-1 to 110-3 may share the same second indication.

In some example embodiments where the plurality of subsets of antenna ports comprises a primary subset of antenna ports and a plurality of secondary subsets of the antenna ports corresponding to the group of devices 110-1 to 110-3, the second indication may include at least one of the following:

first information related to whether at least one secondary subset of antenna ports corresponding to the first device 110 is enabled or disabled, or second information related to which of the at least one secondary subset corresponding to the first device 110 is enabled or disabled, or third information related to whether or not at least one of the first information or the second information is destined to the first device 110.

In some example embodiments, one subset of the plurality of subsets of the antenna ports may correspond to a CDM group.

In some other example embodiments, one subset of the plurality of subsets of the antenna ports comprises at least one of the following: at least one antenna port from a same CDM port group, or at least one antenna port across different CDM port groups.

In some example embodiments, after receiving the first and second indications, the first device 110 may determine at least one first subset of antenna ports from the plurality of subsets of antenna ports based on the first indication and the second indication. In this case, the at least one first subset of antenna ports refers to at least one activated subset of antenna ports that is to be used for communication between the first device 110 and the second device 120. Accordingly, the first device 110 may measure at least one CSI-RS corresponding to the at least one first subset of antenna ports.

The first device 110 may then transmit, to the second device 120, a first CSI report related to the at least one CSI-RS.

In some example embodiments, after receiving the first and second indications, the first device 110 may receive, from the second device 120, a third indication of enabling at least one subset that was disabled via the second indication. In other words, the second device 120 transmits the third indication of re-enabling some of the subsets that was previously disabled. The first device 110 may determine, based on the third indication, a plurality of second subsets of antenna ports from the plurality of subsets of antenna ports. In this case, a plurality of second subsets of antenna ports refers to activated subsets of antenna ports that is to be used for communication between the first device 110 and the second device 120. Accordingly, the first device 110 may measure a plurality of CSI-RSs corresponding to the plurality of second subsets of antenna ports. The first device 110 may then transmit, to the second device 120, a second CSI report related to the plurality of CSI-RSs.

In some example embodiments where the plurality of subsets of antenna ports comprises a primary subset of antenna ports and at least one secondary subset of antenna ports corresponding to the first device 110, the first device 110 may determine the at least one secondary subset of antenna ports to be disabled based on the second indication. Based on the determination, the first device 110 may apply a CBSR or a related parameter (e.g., N1, N2 parameters) associated with the at least one secondary subset of antenna ports for the first device 110. In this case, the association of the antenna port subsets and the CBSR implicitly indicates whether the N1-N2 parameter is applicable. This allows a reduced signaling overhead and power consumption, since the dynamic configuration or indication of CBSR can be omitted.

In some example embodiments, the first device 110 may receive, from the second device 120, at least one of a fourth indication of a CBSR or a fifth indication of a rank restriction. Either or both of the fourth and fifth indications may be via at least one of the following:
- DCI, a MAC CE, etc., that is specific to the first device 110, that is, transmitted in separate messages for different UEs, or
- DCI, a MAC CE, etc., that is specific to a group of devices comprising the first device 110, or a system broadcast message, that is, transmitted in a same group common message for multiple UEs.

In some example embodiments, the fourth indication of the CBSR may be received together with the second indication in a message specific to a group of devices comprising the first device 110. The message may comprise at least a first field of port subset disabling or enabling, and a second field of CBSR. The first filed may comprise at least one bit indicating whether the at least one of the plurality of subsets of antenna ports is disabled or enabled. In some cases, the number of bits in the first field may depend on the number of secondary subsets of antenna ports. In a case where a single secondary subset of antenna ports is configured, there is 1 bit in the first field. The second filed may comprise at least one bit indicating the CBSR for the group of devices 110-1 to 110-3. The number of bits in the second field may depend on a configured number of CBSR or N1-N2 parameter in general or dedicated for dynamic change. In some example embodiments, in addition to the port subset disabling or enabling, restriction on rank may also be indicated for each of the first devices 110-1 to 110-N.

In a case of a multi-panel gNB, such as, for type I multi-panel, multi-panel restriction (e.g., ng-N1-N2 parameter), a number of panels, and so on may be indicated to multiple UEs via separate indications or a group common indication. In some example embodiments, the first device 110 may receive, from the second device 120, a sixth indication of at least one of the following: a multi-panel restriction for the second device 120 or a number of antenna panels, or which panels are muted or active, for the second device 120. The sixth indication may be received together with the second indication, or received separately from the second indication.

Additionally, or alternatively, in some example embodiments, the sixth indication may be via at least one of the following:
- DCI, a MAC CE, etc., that is specific to the first device 110, or
- DCI, a MAC CE, etc., that is specific to a group of devices comprising the first device 110, or a system broadcast message.

In some example embodiments where the second indication is via a message specific to a group of devices comprising the first device 110, the second indication may be received together with at least one of the following:
- CSI-RS resource mapping information, such as, CSI-RS-ResourceMapping or any parameter within this IE,
- a number of the antenna ports, such as, nrofPorts,
- a CSI resource periodicity and offset parameter, such as, CSI-ResourcePeriodicityAndOffset,
- a resource mapping parameter for NZP-CSI-RS resource,
- a codebook configuration.

In some example embodiments, the first device 110 may receive, from the second device 120, a seventh indication of CSI-RS resource information related to the at least one subset of antenna ports indicated via the second indication. In this case, the seventh indication may be received together with the second indication or received separately from the second indication.

In some example embodiments where the second device 120 comprises at least one of multiple transmission and reception points (multi-TRPs), the first device 110 may receive, from the second device 120, an eighth indication of at least one identifier of the at least one transmission and reception point associated with the at least one subset of antenna ports indicated via the second indication. In this case, the eighth indication may be received together with the second indication or received separately from the second indication.

In some example embodiments, the at least one identifier may comprise at least one of the following: at least one TRP ID, at least one CORESETPoolIndex, at least one physical cell identity.

In some example embodiments, an association of respective identifiers of the multi-TRPs with the plurality of subsets of antenna ports may be predetermined. In this case, the first device 110 may determine at least one identifier of the at least one TRP corresponding to at least one resource for receiving the second indication. The first device 110 may then determine the at least one subset of antenna port associated with the at least one identifier of the at least one TRP.

In some example embodiments, the first device 110 may comprise a terminal device (e.g., UE), and the second device 120 may comprise a network device (e.g., gNB).

Figure 5:
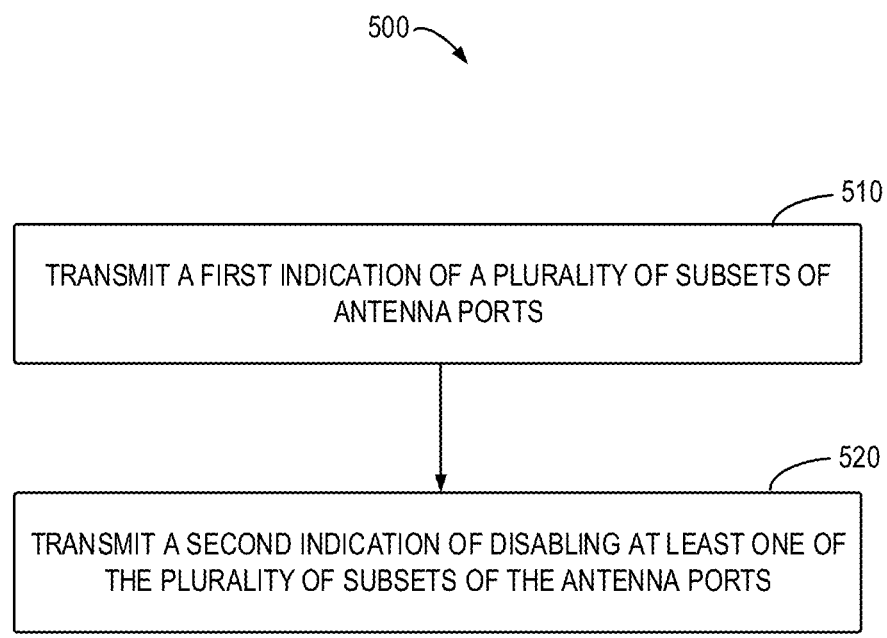
FIG. 5 illustrates a flowchart of another example method according to some example embodiments of the present disclosure.

FIG. 5 illustrates a flowchart of an example method 500 according to some example embodiments of the present disclosure. The method 500 can be implemented at a network device, for example, the second device 120 described with reference to FIG. 1. For the purpose of discussion, the method 500 will be described with reference to FIG. 1. However, in some other embodiments, the method 500 can also be implemented at any other device. Therefore, the scope of the present disclosure is not limited in this regard At 510, the second device 120 transmits, to a first device 110, a first indication of a plurality of subsets of antenna ports. The first indication may be via, for example, DCI, a MAC CE, a RRC message, a system broadcast message, etc.

In some example embodiments the plurality of subsets of antenna ports may comprise a primary subset of antenna ports corresponding to a first set of CSI-RS resources and at least one secondary subset of antenna ports corresponding to at least one second set of CSI-RS resources.

At 520, the second device 120 transmits, to the first device 110, a second indication of disabling at least one of the plurality of subsets of the antenna ports.

In some example embodiments, the second indication may be via DCI, a MAC CE, etc., that is specific to the first device 110, or a system broadcast message. In other words, for each of the first devices 110-1 to 110-N, a different and separate second indication may be transmitted by the second device 120.

In some example embodiments, the second indication may be via DCI, a MAC CE, etc., that is specific to a group of devices comprising the first device 110. In this case, the second indication may be transmitted based on at least one of the following: a RNTI for the group of devices, or a SSS associated with the group of devices, or a control resource associated with the group of devices (e.g., CORESET). In this case, the second indication is provided as a group common indication, and the group of devices 110-1 to 110-3 may share the same second indication.

In some example embodiments where the plurality of subsets of antenna ports comprises a primary subset of antenna ports and a plurality of secondary subsets of the antenna ports corresponding to the group of devices 110-1 to 110-3, the second indication may include at least one of the following:

first information related to whether at least one secondary subset of antenna ports corresponding to the first device 110 is enabled or disabled, or second information related to which of the at least one secondary subset corresponding to the first device 110 is enabled or disabled, or third information related to whether or not at least one of the first information or the second information is destined to the first device 110.

In some example embodiments, one subset of the plurality of subsets of the antenna ports may correspond to a CDM group.

In some other example embodiments, one subset of the plurality of subsets of the antenna ports comprises at least one of the following: at least one antenna port from a same CDM port group, or at least one antenna port across different CDM port groups.

In some example embodiments, after receiving the first and second indications, the second device 120 may transmit to the first device 119 at least one CSI-RS via at least one first subset of antenna ports from the plurality of subsets of antenna ports. The second device 120 may then receive, from the first device 110, a first CSI report related to the at least one CSI-RS.

In some example embodiments, after receiving the first and second indications, the second device 120 may transmit, to the first device 110, a third indication of enabling at least one subset that was disabled via the second indication. The second device 120 may transmit, to the first device 110, a plurality of CSI-RSs corresponding to a plurality of second subsets of antenna ports from the plurality of subsets of antenna ports. The second device 120 may then receive, from the first device 110, a second CSI report related to the plurality of CSI-RSs.

In some example embodiments where the plurality of subsets of antenna ports comprises a primary subset of antenna ports and at least one secondary subset of antenna ports corresponding to the first device 110, the second indication may implicitly indicate that a CBSR or a related parameter (e.g., N1, N2 parameters) associated with at least one secondary subset of antenna ports is applicable. In other words, the association of the antenna port subsets and the CBSR implicitly indicates whether the N1-N2 parameter is applicable. This allows a reduced signaling overhead and power consumption, since in this case the configuration or indication of CBSR can be omitted.

In some example embodiments, the second device 120 may transmit, to the first device 110, at least one of a fourth indication of a CBSR or a fifth indication of a rank restriction. Either or both of the fourth and fifth indications may be via at least one of the following:

DCI, a MAC CE, etc., that is specific to the first device 110, that is, transmitted in separate messages for different UEs, or DCI, a MAC CE, etc., that is specific to a group of devices comprising the first device 110, or a system broadcast message, that is, transmitted in a same group common message for multiple UEs.

In some example embodiments, the fourth indication of the CBSR may be received together with the second indication in a message specific to a group of devices comprising the first device 110. The message may comprise at least a first field of port subset disabling or enabling, and a second field of CBSR. The first filed may comprise at least one bit indicating whether the at least one of the plurality of subsets of antenna ports is disabled or enabled. In some cases, the number of bits in the first field may depend on the number of secondary subsets of antenna ports. In a case where a single secondary subset of antenna ports is configured, there is 1 bit in the first field. The second filed may comprise at least one bit indicating the CBSR for the group of devices 110-1 to 110-N. The number of bits in the second field may depend on a configured number of CBSR or N1-N2 parameter in general or dedicated for dynamic change. In some example embodiments, in addition to the port subset disabling or enabling, the second device 120 may also indicate restriction on rank for each of the first devices 110-1 to 110-N.

In a case of a multi-panel gNB, such as, for type I multi-panel, multi-panel restriction (e.g., ng-N1-N2 parameter), a number of panels, and so on may be indicated to multiple UEs via separate indications or a group common indication. In some example embodiments, the second device 120 may transmit, to the second device 120, a sixth indication of at least one of the following: a multi-panel restriction for the second device 120 or a number of antenna panels, or which panels are muted or active, for the second device 120. The sixth indication may be received together with the second indication, or received separately from the second indication.

Additionally, or alternatively, in some example embodiments, the sixth indication may be via at least one of the following:

DCI, a MAC CE, etc., that is specific to the first device 110, or

DCI, a MAC CE, etc., that is specific to a group of devices comprising the first device 110, or a system broadcast message.

In some example embodiments where the second indication is via a message specific to a group of devices comprising the first device 110, the second indication may be received together with at least one of the following:
- CSI-RS resource mapping information, such as, CSI-RS-ResourceMapping or any parameter within this IE,
- a number of the antenna ports, such as, nrofPorts,
- a CSI resource periodicity and offset parameter, such as, CSI-ResourcePeriodicityAndOffset,
- a resource mapping parameter for NZP-CSI-RS resource,
- a codebook configuration.

In some example embodiments, the second device 120 may transmit, to the first device 110, a seventh indication of CSI-RS resource information related to the at least one subset of antenna ports indicated via the second indication. The seventh indication may be transmitted together with the second indication or transmitted separately from the second indication.

In some example embodiments where the second device 120 comprises at least one of multi-TRPs, the second device 120 may transmit, to the first device 110, an eighth indication of at least one identifier of the at least one TRP associated with the at least one subset of antenna ports indicated via the second indication. The eighth indication may be transmitted together with the second indication or transmitted separately from the second indication, In some example embodiments, the at least one identifier may comprise at least one of the following: at least one TRP ID, at least one CORESETPoolIndex, at least one physical cell identity.

In some example embodiments, an association of respective identifiers of the multi-TRPs with the plurality of subsets of antenna ports may be predetermined. In this case, from the perspective of the first device 110, it may determine at least one identifier of the at least one TRP corresponding to at least one resource for receiving the second indication. The first device 110 may then determine the at least one subset of antenna port associated with the at least one identifier of the at least one TRP.

In some example embodiments, the first device 110 may comprise a terminal device (e.g., UE), and the second device 120 may comprise a network device (e.g., gNB).

According to the example embodiments, a group common indication is supported for antenna port related configurations. With the efficient adaptation of antenna port related configurations, the antenna port subsets can be dynamically disabled or re-enabled at RAN. In this way, the power consumption in the network can be reduced, and communication efficiency can be improved.

In some example embodiments, an apparatus capable of performing the method 400 (for example, the first device 110) may comprise means for performing the respective steps of the method 400. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the apparatus.

In some example embodiments, the apparatus comprises: means for receiving, from a network device, a first indication of a plurality of subsets of antenna ports; and means for receiving, from the network device, a second indication of disabling at least one of the plurality of subsets of antenna ports.

In some example embodiments, the plurality of subsets of antenna ports comprises a primary subset of antenna ports corresponding to a first set of channel state information reference signal resources and at least one secondary subset of antenna ports corresponding to at least one second set of channel state information reference signal resources.

In some example embodiments, the second indication is via downlink control information or a medium access control control element specific to the apparatus.

In some example embodiments, the second indication is via downlink control information or a medium access control control element specific to a group of apparatuses comprising the apparatus, and the second indication is received based on at least one of the following:
- a radio network temporary identity for the group of apparatuses, or
- a search space set associated with the group of apparatuses, or
- a control resource associated with the group of apparatuses.

In some example embodiments, the plurality of subsets of antenna ports comprises a primary subset of antenna ports and a plurality of secondary subsets of the antenna ports corresponding to the group of apparatuses, and the second indication comprises at least one of the following:
- first information related to whether at least one secondary subset of antenna ports corresponding to the apparatus is enabled or disabled, or
- second information related to which of the at least one secondary subset corresponding to the apparatus is enabled or disabled, or
- third information related to whether or not at least one of the first information or the second information is destined to the apparatus.

In some example embodiments, one subset of the plurality of subsets of the antenna ports corresponds to a code division multiplexing port group.

In some example embodiments, one subset of the plurality of subsets of the antenna ports comprises at least one of the following: at least one antenna port from a same code division multiplexing port group, or at least one antenna port across different code division multiplexing port groups.

In some example embodiments, the apparatus further comprises: means for determining, based on the first indication and the second indication, at least one first subset of antenna ports from the plurality of subsets of antenna ports; means for measuring at least one channel state information reference signal corresponding to the at least one first subset of antenna ports; and means for transmitting, to the network device, a first channel state information report related to the at least one channel state information reference signal.

In some example embodiments, the apparatus further comprises: means for receiving, from the network device, a third indication of enabling at least one subset that was disabled via the second indication; means for determining, based on the third indication, a plurality of second subsets of antenna ports from the plurality of subsets of antenna ports; means for measuring a plurality of channel state information reference signals corresponding to the plurality of second subsets of antenna ports; and means for transmitting, to the network device, a second channel state information report related to the plurality of channel state information reference signals.

In some example embodiments, the plurality of subsets of antenna ports comprises a primary subset of antenna ports and at least one secondary subset of antenna ports corresponding to the apparatus. The apparatus further comprises means for determining the at least one secondary subset of antenna ports to be disabled based on the second indication; and means for based on the determining the at least one secondary subset of antenna ports to be disabled based on the second indication, applying a codebook subset restriction or a related parameter associated with the at least one secondary subset of antenna ports for the apparatus In some example embodiments, the apparatus further comprises means for receiving, from the network device, at least one of a fourth indication of a codebook subset restriction or a fifth indication of a rank restriction.

In some example embodiments, the at least one of the fourth indication or the fifth indication is via at least one of the following:
 downlink control information or a medium access control control element specific to the apparatus, or
 downlink control information or a medium access control control element specific to a group of apparatuses comprising the apparatus.

In some example embodiments, the fourth indication is received together with the second indication in a message, and wherein the message comprises:
 a first field comprising at least one bit indicating whether the at least one of the plurality of subsets of antenna ports is disabled or enabled, and
 a second field comprising at least one bit indicating the codebook subset restriction for the group of apparatuses.

In some example embodiments, the apparatus further comprises means for receiving from the network device, a sixth indication of at least one of the following:
 a multi-panel restriction for the network device, or
 a number of antenna panels for the network device,
 wherein the sixth indication is received together with the second indication or received separately from the second indication.

In some example embodiments, the sixth indication is via at least one of the following:
 downlink control information or a medium access control control element specific to the apparatus, or
 downlink control information or a medium access control control element specific to a group of apparatuses comprising the apparatus.

In some example embodiments, the second indication is via a message specific to a group of apparatuses comprising the apparatus, and the second indication is received together with at least one of the following:
 channel state information reference signal resource mapping information,
 frequency domain allocation configuration,
 a number of the antenna ports,
 a channel state information resource periodicity and offset parameter,
 a resource mapping parameter for non-zero power channel state information reference signal resource,
 a codebook configuration.

In some example embodiments, the apparatus further comprises: means for receiving, from the network device, a seventh indication of channel state information reference signal resource information related to the at least one subset of antenna ports indicated via the second indication, wherein the seventh indication is received together with the second indication or received separately from the second indication.

In some example embodiments, the network device comprises at least one of multiple transmission and reception points, and the apparatus further comprises: means for receiving, from the network device, an eighth indication of at least one identifier of the at least one transmission and reception point associated with the at least one subset of antenna ports indicated via the second indication, wherein the eighth indication is received together with the second indication or received separately from the second indication.

In some example embodiments, the at least one identifier comprises at least one of the following: at least one transmission and reception port identity, at least one control resource set pool index, at least one physical cell identity.

In some example embodiments, an association of respective identifiers of the multiple transmission and reception points with the plurality of subsets of antenna ports is predetermined, and the apparatus further comprises: means for determining at least one identifier of the at least one transmission and reception point corresponding to at least one resource for receiving the second indication; and means for determining the at least one subset of antenna port associated with the at least one identifier of the at least one transmission and reception point.

In some example embodiments, the apparatus comprises a terminal device.

In some example embodiments, an apparatus capable of performing the method 500 (for example, the second device 120) may comprise means for performing the respective steps of the method 500. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the apparatus.

In some example embodiments, the apparatus comprises: means for transmitting, to a terminal device, a first indication of a plurality of subsets of antenna ports; and means for transmitting, to the terminal device, a second indication of disabling at least one of the plurality of subsets of the antenna ports.

In some example embodiments, the plurality of subsets of antenna ports comprises a primary subset of antenna ports corresponding to a first set of channel state information reference signal resources and at least one secondary subset of antenna ports corresponding to at least one second set of channel state information reference signal resources.

In some example embodiments, the second indication is via downlink control information or a medium access control control element specific to the terminal device.

In some example embodiments, the second indication is via downlink control information or a medium access control control element specific to a group of apparatuses comprising the terminal device, and the second indication is transmitted based on at least one of the following:
 a radio network temporary identity for the group of apparatuses, or
 a search space set associated with the group of apparatuses, or
 a control resource associated with the group of apparatuses.

In some example embodiments, the plurality of subsets of antenna ports comprises a primary subset of antenna ports and a plurality of secondary subsets of the antenna ports corresponding to the group of apparatuses, and the second indication comprises at least one of the following:

first information related to whether at least one secondary subset of antenna ports corresponding to the terminal device is enabled or disabled, or second information related to which of the at least one secondary subset corresponding to the terminal device is enabled or disabled, or third information related to whether or not at least one of the first information or the second information is destined to the terminal device.

In some example embodiments, one subset of the plurality of subsets of the antenna ports corresponds to a code division multiplexing port group.

In some example embodiments, one subset of the plurality of subsets of the antenna ports comprises at least one of the following:

at least one antenna port from a same code division multiplexing port group, or at least one antenna port across different code division multiplexing port groups.

In some example embodiments, the apparatus further comprises: means for transmitting, to the terminal device, at least one channel state information reference signal via at least one first subset of antenna ports from the plurality of subsets of antenna ports; and means for receiving, from the terminal device, a first channel state information report related to the at least one channel state information reference signal.

In some example embodiments, the apparatus further comprises: means for transmitting, to the terminal device, a third indication of enabling at least one subset that was disabled via the second indication; means for transmitting, to the terminal device, a plurality of channel state information reference signals corresponding to a plurality of second subsets of antenna ports from the plurality of subsets of antenna ports; and means for receiving, from the terminal device, a second channel state information report related to the plurality of channel state information reference signals.

In some example embodiments, the apparatus further comprises: means for transmitting, to the terminal device, at least one of a fourth indication of a codebook subset restriction or a fifth indication of a rank restriction.

In some example embodiments, the at least one of the fourth indication or the fifth indication is via at least one of the following:

downlink control information or a medium access control control element specific to the terminal device, or downlink control information or a medium access control control element specific to a group of apparatuses comprising the terminal device.

In some example embodiments, the fourth indication is received together with the second indication in a message, and wherein the message comprises:

a first field comprising at least one bit indicating whether the at least one of the plurality of subsets of antenna ports is disabled or enabled, and a second field comprising at least one bit indicating the codebook subset restriction for the group of apparatuses.

In some example embodiments, the apparatus further comprises: means for transmit, to the terminal device, a sixth indication of at least one of the following:

a multi-panel restriction for the apparatus, or a number of antenna panels for the apparatus, wherein the sixth indication is transmitted together with the second indication or transmitted separately from the second indication.

In some example embodiments, the sixth indication is via at least one of the following:

downlink control information or a medium access control control element specific to the terminal device, or downlink control information or a medium access control control element specific to a group of apparatuses comprising the terminal device.

In some example embodiments, the second indication is via a message specific to a group of apparatuses comprising the terminal device, and the second indication is received together with at least one of the following:

channel state information reference signal resource mapping information, frequency domain allocation configuration, a number of the antenna ports, a channel state information resource periodicity and offset parameter, a resource mapping parameter for non-zero power channel state information reference signal resource, a code book configuration.

In some example embodiments, the apparatus further comprises: means for transmitting, to the terminal device, a seventh indication of channel state information reference signal resource information related to the at least one subset of antenna ports indicated via the second indication, wherein the seventh indication is transmitted together with the second indication or transmitted separately from the second indication.

In some example embodiments, the apparatus comprises at least one of multiple transmission and reception points, and the apparatus further comprises: means for transmitting, to the terminal device, an eighth indication of at least one identifier of the at least one transmission and reception point associated with the at least one subset of antenna ports indicated via the second indication, wherein the eighth indication is transmitted together with the second indication or transmitted separately from the second indication.

In some example embodiments, the at least one identifier comprises at least one of the following: at least one transmission and reception port identity, at least one control resource set pool index, at least one physical cell identity.

In some example embodiments, an association of respective identifiers of the multiple transmission and reception points with the plurality of subsets of antenna ports is predetermined.

In some example embodiments, the apparatus comprises a network device.

Figure 6:
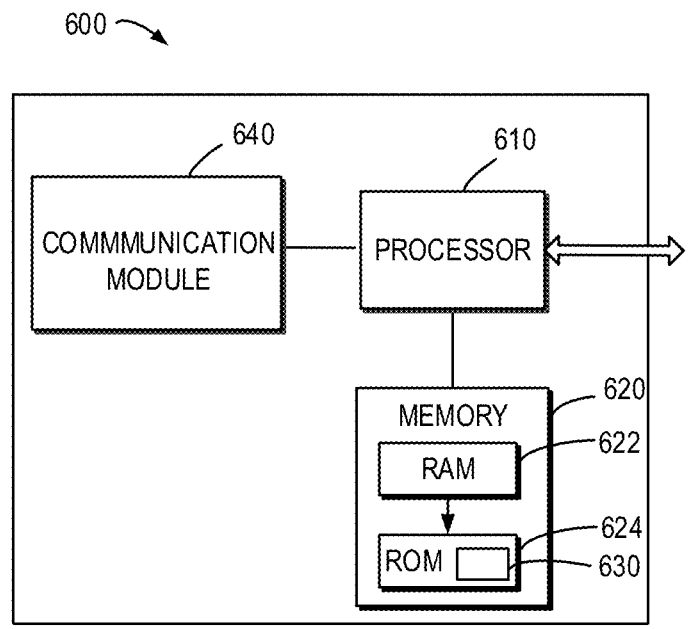
FIG. 6 shows a simplified block diagram of a device that is suitable for implementing example embodiments of the present disclosure.

FIG. 6 is a simplified block diagram of a device 600 that is suitable for implementing embodiments of the present disclosure. The device 600 may be provided to implement the communication device, for example the first device 110 or the second device 120 as shown in FIG. 1. As shown, the device 600 includes one or more processors 610, one or more memories 620 coupled to the processor 610, and one or more transmitters and/or receivers (TX/RX) 640 (i.e., the communication module 640) coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 624. The processor 610 may perform any suitable actions and processing by loading the program 630 into the RAM 622.

The embodiments of the present disclosure may be implemented by means of the program 630 so that the device 600 may perform any process of the disclosure as discussed with reference to FIG. 2 to FIG. 5. The embodiments of the present disclosure may also be implemented by hardware or by a combination of software and hardware.

Figure 7:
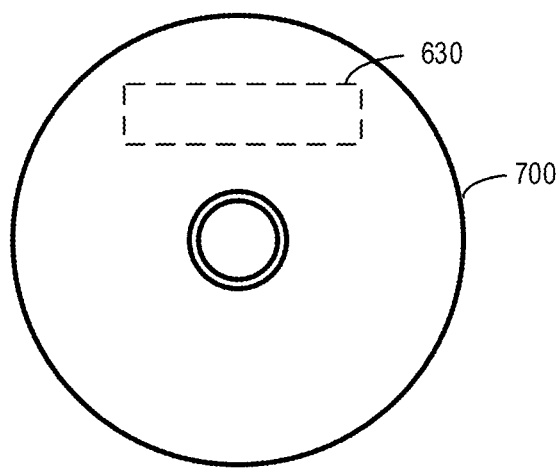
FIG. 7 shows a block diagram of an example computer readable medium in accordance with some embodiments of the present disclosure.

In some embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 or 500 as described above with reference to FIG. 4 and FIG. 5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:
1. A first device, comprising:
at least one processor; and
at least one memory storing instructions that, when executed by the at least one processor, cause the first device at least to:
receive, from a second device, a first indication of a plurality of subsets of antenna ports; and receive, from the second device, a second indication of disabling at least one of the plurality of subsets of antenna ports, wherein the second indication is via downlink control information or a medium access control control element specific to the first device.

2. The first device of claim 1, wherein the plurality of subsets of antenna ports comprises a primary subset of the antenna ports and a plurality of secondary subsets of the antenna ports corresponding to the group of devices, and wherein the second indication comprises at least one of the following:
first information related to whether at least one secondary subset of the antenna ports corresponding to the first device is enabled or disabled, or
second information related to which of the at least one secondary subset corresponding to the first device is enabled or disabled, or
third information related to whether or not at least one of the first information or the second information is destined to the first device.

3. The first device of claim 1, wherein the at least one memory storing instructions that, when executed by the at least one processor, further cause the first device to:
determine, based on the first indication and the second indication, at least one first subset of antenna ports from the plurality of subsets of antenna ports;
measure at least one channel state information reference signal corresponding to the at least one first subset of antenna ports; and
transmit, to the second device, a first channel state information report related to the at least one channel state information reference signal.

4. The first device of claim 1, wherein the at least one memory storing instructions that, when executed by the at least one processor, further cause the first device to:
receive, from the second device, a third indication of enabling at least one subset that was disabled via the second indication;
determine, based on the third indication, a plurality of second subsets of antenna ports from the plurality of subsets of antenna ports;
measure a plurality of channel state information reference signals corresponding to the plurality of second subsets of antenna ports; and
transmit, to the second device, a second channel state information report related to the plurality of channel state information reference signals.

5. The first device of claim 1, wherein the plurality of subsets of antenna ports comprises a primary subset of antenna ports and at least one secondary subset of antenna ports corresponding to the first device, and
wherein the at least one memory storing instructions that, when executed by the at least one processor, further cause the first device to:
determine the at least one secondary subset of the antenna ports to be disabled based on the second indication; and
based on the determining the at least one secondary subset of the antenna ports to be disabled based on the second indication, apply a codebook subset restriction or a related parameter associated with the at least one secondary subset of the antenna ports for the first device.

6. The first device of claim 1, wherein the at least one memory storing instructions that, when executed by the at least one processor, further cause the first device to:
receive, from the second device, at least one of a fourth indication of a codebook subset restriction or a fifth indication of a rank restriction.

7. The first device of claim 1, wherein the at least one memory storing instructions that, when executed by the at least one processor, further cause the first device to:
receive, from the second device, a sixth indication of at least one of the following:
a multi-panel restriction for the second device, or
a number of antenna panels for the second device,
wherein the sixth indication is received together with the second indication or received separately from the second indication.

8. The first device of claim 1, wherein the at least one memory storing instructions that, when executed by the at least one processor, further cause the first device to:
receive, from the second device, a seventh indication of channel state information reference signal resource information related to the at least one subset of antenna ports indicated via the second indication,
wherein the seventh indication is received together with the second indication or received separately from the second indication.

9. The first device of claim 1, wherein the second device comprises at least one of multiple transmission and reception points, and
wherein the at least one memory storing instructions that, when executed by the at least one processor, further cause the first device to:
receive, from the second device, an eighth indication of at least one identifier of the at least one transmission and reception point associated with the at least one subset of antenna ports indicated via the second indication,
wherein the eighth indication is received together with the second indication or received separately from the second indication.

10. The first device of claim 1, wherein an association of respective identifiers of the multiple transmission and reception points with the plurality of subsets of antenna ports is predetermined, and
wherein the at least one memory storing instructions that, when executed by the at least one processor, further cause the first device to:
determine at least one identifier of the at least one transmission and reception point corresponding to at least one resource for receiving the second indication; and
determine the at least one subset of antenna port associated with the at least one identifier of the at least one transmission and reception point.

11. A second device, comprising:
at least one processor; and
at least one memory storing instructions that, when executed by the at least one processor, cause the second device at least to:
transmit, to a first device, a first indication of a plurality of subsets of antenna ports; and
transmit, to the first device, a second indication of disabling at least one of the plurality of subsets of the antenna ports, wherein the plurality of subsets of antenna ports comprises a primary subset of antenna ports corresponding to a first set of channel state information reference signal resources and at least one secondary subset of antenna ports corresponding to at least one second set of channel state information reference signal resources.

12. The second device of claim 11, wherein the second indication is via downlink control information or a medium access control control element specific to a group of devices comprising the first device, and the second indication is transmitted based on at least one of the following:
   a radio network temporary identity for the group of devices, or
   a search space set associated with the group of devices, or
   a control resource associated with the group of devices.

13. The second device of claim 11, wherein the plurality of subsets of antenna ports comprises a primary subset of antenna ports and a plurality of secondary subsets of antenna ports corresponding to the group of devices, and
   wherein the second indication comprises at least one of the following:
      first information related to whether at least one secondary subset of the antenna ports corresponding to the first device is enabled or disabled, or
      second information related to which of the at least one secondary subset corresponding to the first device is enabled or disabled, or
      third in information related to whether or not at least one of the first information or the second information is destined to the first device.

14. The second device of claim 11, wherein one subset of the plurality of subsets of antenna ports corresponds to a code division multiplexing port group.

15. The second device of claim 11, wherein the at least one memory storing instructions that, when executed by the at least one processor, further cause the second device to:
   transmit, to the first device, at least one channel state information reference signal via at least one first subset of antenna ports from the plurality of subsets of antenna ports; and
   receive, from the first device, a first channel state information report related to a measurement result of the at least one channel state information reference signal.

16. The second device of claim 11, wherein the at least one memory storing instructions that, when executed by the at least one processor, further cause the second device to:
   transmit, to the first device, a third indication of enabling at least one subset that was disabled via the second indication;
   transmit, to the first device, a plurality of channel state information reference signals corresponding to a plurality of second subsets of antenna ports from the plurality of subsets of antenna ports; and
   receive, from the first device, a second channel state information report related to the plurality of channel state information reference signals.

17. The second device of claim 11, wherein the at least one memory storing instructions that, when executed by the at least one processor, further cause the second device to:
   transmit, to the first device, at least one of a fourth indication of a codebook subset restriction or a fifth indication of a rank restriction.

18. The second device of claim 11, wherein the at least one memory storing instructions that, when executed by the at least one processor, further cause the second device to:
   transmit, to the first device, a sixth indication of at least one of the following:
      a multi-panel restriction for the second device, or
      a number of antenna panels for the second device,
   wherein the sixth indication is transmitted together with the second indication or transmitted separately from the second indication.

19. The second device of claim 11, wherein the at least one memory storing instructions that, when executed by the at least one processor, further cause the second device to:
   transmit, to the first device, a seventh indication of channel state information reference signal resource information related to the at least one subset of antenna ports indicated via the second indication,
   wherein the seventh indication is transmitted together with the second indication or transmitted separately from the second indication.

20. The second device of claim 11, wherein the second device comprises at least one of multiple transmission and reception points, and
   wherein the at least one memory storing instructions that, when executed by the at least one processor, further cause the second device to:
      transmit, to the first device, an eighth indication of at least one identifier of the at least one transmission and reception point associated with the at least one subset of antenna ports indicated via the second indication,
      wherein the eighth indication is transmitted together with the second indication or transmitted separately from the second indication.

* * * * *